(12) United States Patent
Yamato et al.

(10) Patent No.: US 9,294,020 B2
(45) Date of Patent: Mar. 22, 2016

(54) MOTOR DRIVING DEVICE

(71) Applicant: Rohm Co., Ltd., Kyoto (JP)

(72) Inventors: Tetsuo Yamato, Kyoto (JP); Noboru Takizawa, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 0 days.

(21) Appl. No.: 14/450,438

(22) Filed: Aug. 4, 2014

(65) Prior Publication Data

US 2015/0042250 A1    Feb. 12, 2015

(30) Foreign Application Priority Data

Aug. 6, 2013  (JP) ................. 2013-162905

(51) Int. Cl.
| | |
|---|---|
| H02P 6/06 | (2006.01) |
| H02P 6/08 | (2006.01) |
| H02P 6/00 | (2006.01) |
| H02P 23/00 | (2006.01) |

(52) U.S. Cl.
CPC ........ *H02P 6/08* (2013.01); *H02P 6/002* (2013.01); *H02P 23/0068* (2013.01)

(58) Field of Classification Search
CPC ............................................. H02P 6/08
USPC .................................................. 318/400.05
See application file for complete search history.

(56) References Cited

U.S. PATENT DOCUMENTS

| | | | | |
|---|---|---|---|---|
| 5,631,999 | A | * | 5/1997 | Dinsmore ............... 388/805 |
| 2003/0117448 | A1 | * | 6/2003 | Kokubo et al. ............ 347/5 |
| 2004/0062278 | A1 | * | 4/2004 | Hadzic et al. ........... 370/503 |
| 2010/0271140 | A1 | * | 10/2010 | Raghunathan et al. ..... 331/34 |

FOREIGN PATENT DOCUMENTS

JP    2012-125061    6/2012

* cited by examiner

*Primary Examiner* — Erick Glass
(74) *Attorney, Agent, or Firm* — Fish & Richardson P.C.

(57) ABSTRACT

A motor driving device includes a logic unit configured to control an electrical conduction of a motor, a reference clock signal generating unit configured to generate a reference clock signal based on a rotational speed indication signal, a rotational speed signal generating unit configured to generate a rotational speed signal based on a rotational speed of the motor, and a rotational speed feedback control unit configured to receive the reference clock signal and the rotational speed signal and control the logic unit so that the rotational speed of the motor reaches a target value. The rotational speed feedback control unit changes a feedback gain in response to the rotational speed signal.

9 Claims, 14 Drawing Sheets

MOTOR DRIVING DEVICE

CROSS-REFERENCE TO RELATED APPLICATION

This application is based upon and claims the benefit of priority from Japanese Patent Application No. 2013-162905, filed on Aug. 6, 2013, the entire contents of which are incorporated herein by reference.

TECHNICAL FIELD

The present disclosure relates to a motor driving device configured to control driving of a brushless DC motor.

BACKGROUND

In controlling the driving of a HVAC (Heating, Ventilation and Air Conditioning) motor and a battery cooling fan motor, rotational speed feedback control may be needed for the purpose of (1) adjustment of the amount of conditioned air by automatic air conditioning, (2) adjustment of the amount of cooled air in response to an increase in battery temperature, and (3) prevention of change in the amount of air due to variation of a power supply or a load, and so on.

For the rotational speed feedback control, unavoidable hunting (variation of rotational speed) occurs when the motor is rotated at a low speed. In order to avoid such hunting, existing motor driving devices have employed a method of masking rotational speed feedback control and switching the rotational speed feedback control to open control or a method of stopping the driving of the motor when the motor is rotated at a low speed.

However, the method of masking the rotational speed feedback control has a problem in that the rotational speed fluctuate when the rotational speed feedback control is switched to the open control. Further, since a rotational speed to arouse hunting may fluctuate depending on the number of poles of the motor, it may be difficult to avoid hunting with existing methods.

In a related art, a motor control circuit for selectively setting a control gain which is suitable in low speed rotation or in high speed rotation of the motor is described. However, the motor control circuit is configured to switch the control gain in response to a switching signal associated with an external input signal. That is, the motor control circuit may not switch the control gain based on its internal condition.

SUMMARY

The present disclosure provides some embodiments of a motor driving device which is capable of performing a rotational speed feedback control even in low speed rotation of a motor, an electronic apparatus and a vehicle including the same.

According to one embodiment of the present disclosure, there is provided a motor driving device including a logic unit configured to control an electrical conduction of a motor, a reference clock signal generating unit configured to generate a reference clock signal based on a rotational speed indication signal, a rotational speed signal generating unit configured to generate a rotational speed signal based on a rotational speed of the motor, and a rotational speed feedback control unit configured to receive the reference clock signal and the rotational speed signal and control the logic unit so that the rotational speed of the motor reaches a target value, wherein the rotational speed feedback control unit changes a feedback gain in response to the rotational speed signal.

The rotational speed feedback control unit may include a Frequency Locked Loop (FLL) unit configured to generate a frequency error signal by comparing the reference clock signal and the rotational speed signal, a charge pump unit configured to increase or decrease an output voltage in response to the frequency error signal, and an integral amplifier unit configured to generate a feedback signal by integrally amplifying the output voltage with a gain which is varied based on the rotational speed signal, and wherein the logic unit chops an electrical conduction signal with a duty cycle which is changed depending on the feedback signal.

The integral amplifier unit may vary the gain step by step in response to the rotational speed signal.

The integral amplifier unit may vary the gain with hysteresis.

The integral amplifier unit may vary the gain continuously in response to the rotational speed signal.

The rotational speed feedback control unit may further include a Phase Locked Loop (PLL) unit configured to output a frequency-adjusted reference clock signal to the FLL unit by multiplying a frequency of the received reference clock signal.

The motor driving device may further include a soft processing unit configured to suppress a steep frequency fluctuation of the reference clock signal.

The motor driving device may further include a mask unit configured to mask the feedback signal in response to the rotational speed signal.

According to another embodiment of the present disclosure, there is provided an electronic apparatus including a motor, and the above-described motor driving device which is configured to drive the motor.

According to another embodiment of the present disclosure, there is provided a vehicle including the above-described electronic apparatus.

DETAILED DESCRIPTION

<Electronic Apparatus>

Figure 1:
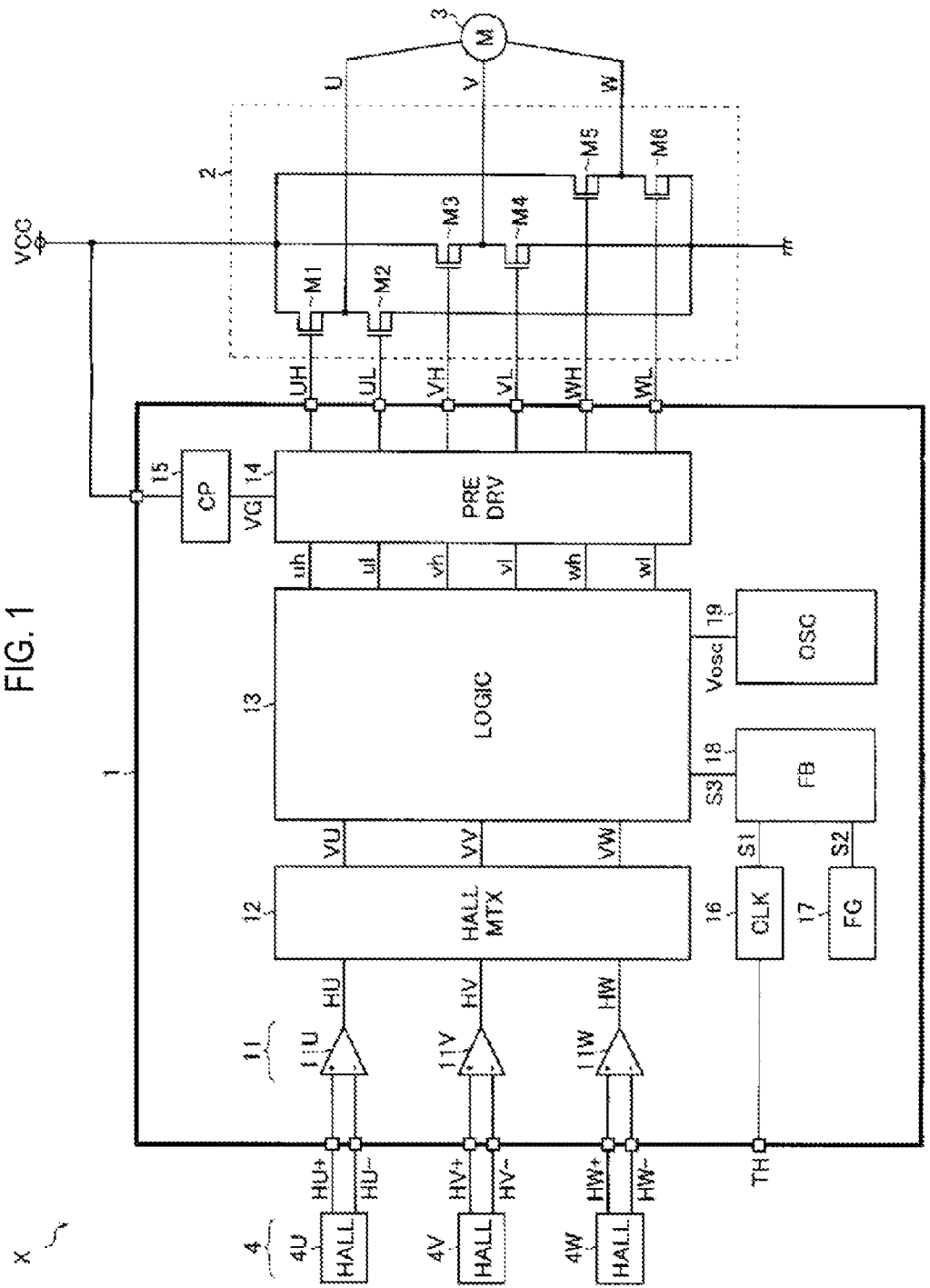
FIG. 1 illustrates a block diagram for an overall configuration of an electronic apparatus, according to one embodiment of the present disclosure.

FIG. 1 illustrates a block diagram for an overall configuration of an electronic apparatus X equipped with a 3-phase brushless DC motor 3, according to one embodiment of the present disclosure. The electronic apparatus X includes a semiconductor device 1, a driver 2, a 3-phase brushless DC motor 3 (hereinafter referred to as a "motor 3") and a hall sensor unit 4.

The semiconductor device 1 may be a motor driving device (e.g., motor driver IC) for driving the motor 3. The semiconductor device 1 may include a position signal generating unit 11, a hall matrix 12, a logic unit 13, a pre-driver 14, a charge pump 15, a reference clock signal generating unit 16, a rotational speed signal generating unit 17, a rotation speed feedback control unit 18 and a triangular wave oscillating unit 19, as illustrated in FIG. 1.

The position signal generating unit 11 may be a circuit for generating square wave position signals HU, HV and HW based on a position of a rotor of the motor 3 and may include hall comparators 11U, 11V and 11W with hysteresis. The hall comparators 11U, 11V and 11W are provided for three phases U, V and W of the motor 3, respectively. The hall comparators 11U, 11V and 11W may receive their respective positive/negative hall signals HU+/HU−, HV+/HV− and HW+/HW− input from their respective hall sensors 4U, 4V and 4W, and generate their respective position signals HU, HV and HW by comparing their respective positive/negative hall signals HU+/HU−, HV+/HV− and HW+/HW−.

Figure 5:
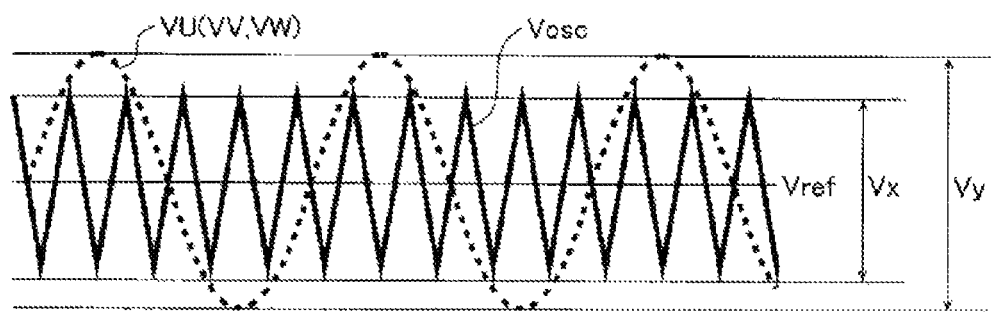
FIG. 5 describes a diagram showing waveforms of a triangular wave voltage and a hall voltage, according to one embodiment of the present disclosure.

The hall matrix 12 may generate hall voltages VU, VV and VW for respective phases by signal processing the position signals HU, HV and HW in a specified manner (e.g., forward/backward rotation switching, offset adjustment, automatic gain control). The hall voltages VU, VV and VW may be analog voltage signals with 3-phase modulation (e.g., a sinusoidal waveform as illustrated in FIGS. 5) and 2-phase modulation (hip shape) in response to a driving waveform.

The logic unit 13 may generate pre-driver driving signals uh/ul, vh/vl and wh/wl for respective phases to perform switching (e.g., excitation phase switching) at an appropriate phase switching timing according to the hall voltages VU, VV and VW for respective phases. The motor 3 may be under an electrical conduction control based on the generated pre-driver driving signals uh/ul, vh/vl and wh/wl. The logic unit 13 may perform chopping of the pre-driver driving signals uh/ul, vh/vl and wh/wl by comparing the hall voltages VU, VV and VW with a triangular wave voltage Vosc. The logic unit 13 may also control a duty cycle of the chopping by changing the amplitude Vy of each of the hall voltages VU, VV and VW based on a feedback signal S3.

The pre-driver 14 may generate driver driving signals UH/UL, VH/VL and WH/WL for respective phases by signal processing the pre-driver driving signals uh/ul, vh/vl and wh/wl for respective phases in a specified manner (e.g., including level shifting, waveform shaping).

The charge pump 15 may generate a boosting voltage VG (also referred to as "pre-driver power supply voltage") from a power supply voltage VCC and output the boosting voltage VG to the pre-driver 14.

The reference clock signal generating unit 16 may generate a reference clock signal S1 having an oscillation frequency f1 based on a rotational speed indication signal TH input from an outside of the semiconductor device 1. The reference clock signal generating unit 16 may receive either an analog voltage signal or a pulse width modulation signal as the rotational speed indication signal TH.

The rotational speed signal generating unit 17 may generate a Frequency Generator (FG) signal (also referred to as "rotational speed signal") S2 having an oscillation frequency f2 which is varied depending on the rotational speed of the motor 3 from, for example, the position signal HU of U phase, the position signal HV of V phase, or the position signal HW of W phase.

The rotational speed feedback control unit 18 may receive the reference clock signal S1 and the FG signal S2 and generates the feedback signal S3 to allow the rotational speed of the motor 3 to reach a target value. A configuration and an operation of the rotational speed feedback control unit 18 will be described below.

The triangular wave oscillating unit 19 may generate the triangular wave voltage Vosc with its fixed amplitude Vx and oscillation frequency fx (see the solid line in FIG. 5) and output the triangular wave voltage Vosc to the logic unit 13. The oscillation frequency fx may be adjusted using an external capacitor or a resistor (not shown).

In addition to the elements of the semiconductor device 1 described above, for example, an internal reference voltage generating unit, a standby control unit, an advancing angle control unit and various protection units (such as an overvoltage protection unit, an overcurrent protection unit, a temperature protection unit, a lock protection unit, or the like.) may be integrated in the semiconductor device 1, detailed explanation of which will be omitted herein.

The driver 2 is configured as a power output stage to generate electrical conduction signals U, V and W for respective phases based on the driver driving signals UH/UL, VH/VL and WH/WL for respective phases. The driver 2 may include power transistors M1 to M6, such as Metal Oxide Semiconductor Field Effect Transistors (MOSFETs), Insulated Gate Bipolar Transistors (IGBTs), or the like. Drains of the upper power transistors M1, M3 and M5 are connected to an input terminal for the power supply voltage VCC. Sources and back gates of the upper power transistors M1, M3 and M5 are connected to respective phase terminals of the motor 3 and drains of the lower power transistors M2, M4 and M6 are connected to the respective phase terminals of the motor 3. Sources and back gates of the lower power transistors M2, M4 and M6 are connected to a ground terminal. Although all of the power transistors M1 to M6 are described as N channel transistors in FIG. 1, the upper power transistors M1, M3 and M5 may be P channel transistors. In such a configuration, the charge pump 15 of the semiconductor device 1 may be omitted.

Figure 2:
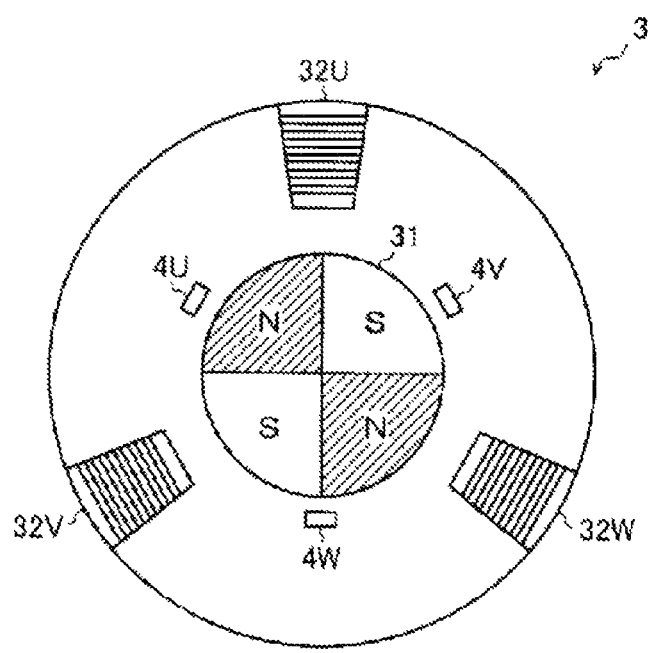
FIG. 2 illustrates a schematic view of an internal structure of a motor, according to one embodiment of the present disclosure.

The motor 3 includes a rotor 31 having a 4-pole permanent magnet, and 3-slot stators 32U, 32V and 32W on which coils are respectively wound, as shown in FIG. 2. A combination of the number of poles and the number of slots is not limited to the 4-pole/3-slot structure but may employ other structures (e.g., 2-pole/3-slot structure and 4-pole/6-slot structure).

The hall sensor unit 4 includes the hall sensors 4U, 4V and 4W for respective phases which are respectively provided at positions having the same phase angle with respect to the stators 32U, 32V and 32W for respective phases, as shown in FIG. 2. The hall sensors 4U, 4V and 4W may detect a magnetic field (e.g., magnetic field intensity) of the rotor 31 and generate the hall signals HU+/HU−, HV+/HV− and HW+/HW− for respective phases depending on the position of the rotor 31. In addition, instead of the hall sensor unit 4, a hall IC for generating a square wave signal may be employed to generate the hall signals. When the hall IC is employed, the hall comparators 11U, 11V and 11W of the semiconductor device 1 may be omitted. Alternatively, the hall comparators 11U, 11V and 11W of the semiconductor device 1 may be provided for use in externally connecting with any of the hall sensor unit 4 and the hall IC.

<180° Electrical Conduction Control>

Figure 3:
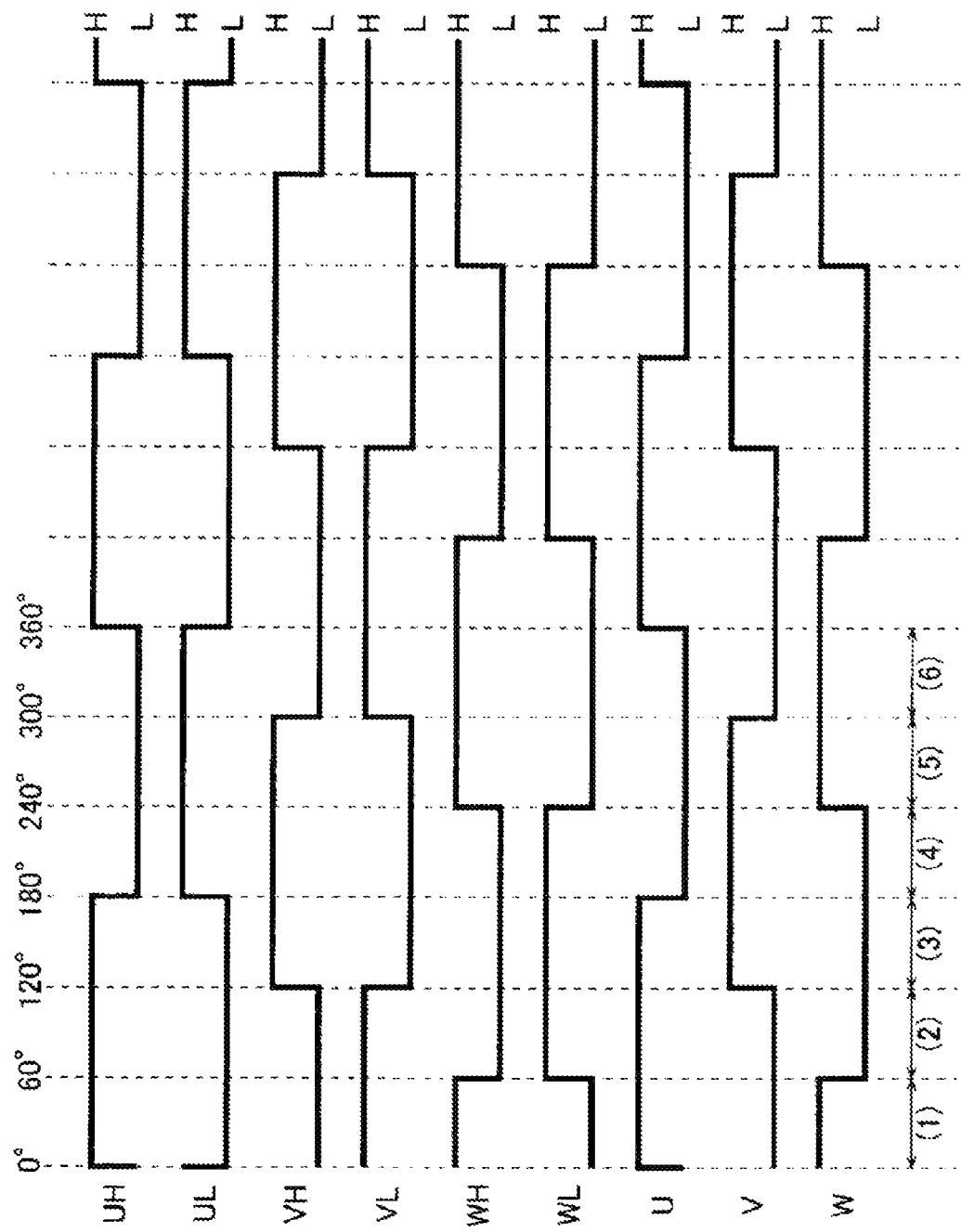
FIG. 3 shows a timing chart showing transitions of driver driving signals and electrical conducting signals, according to one embodiment of the present disclosure.
Figure 4:
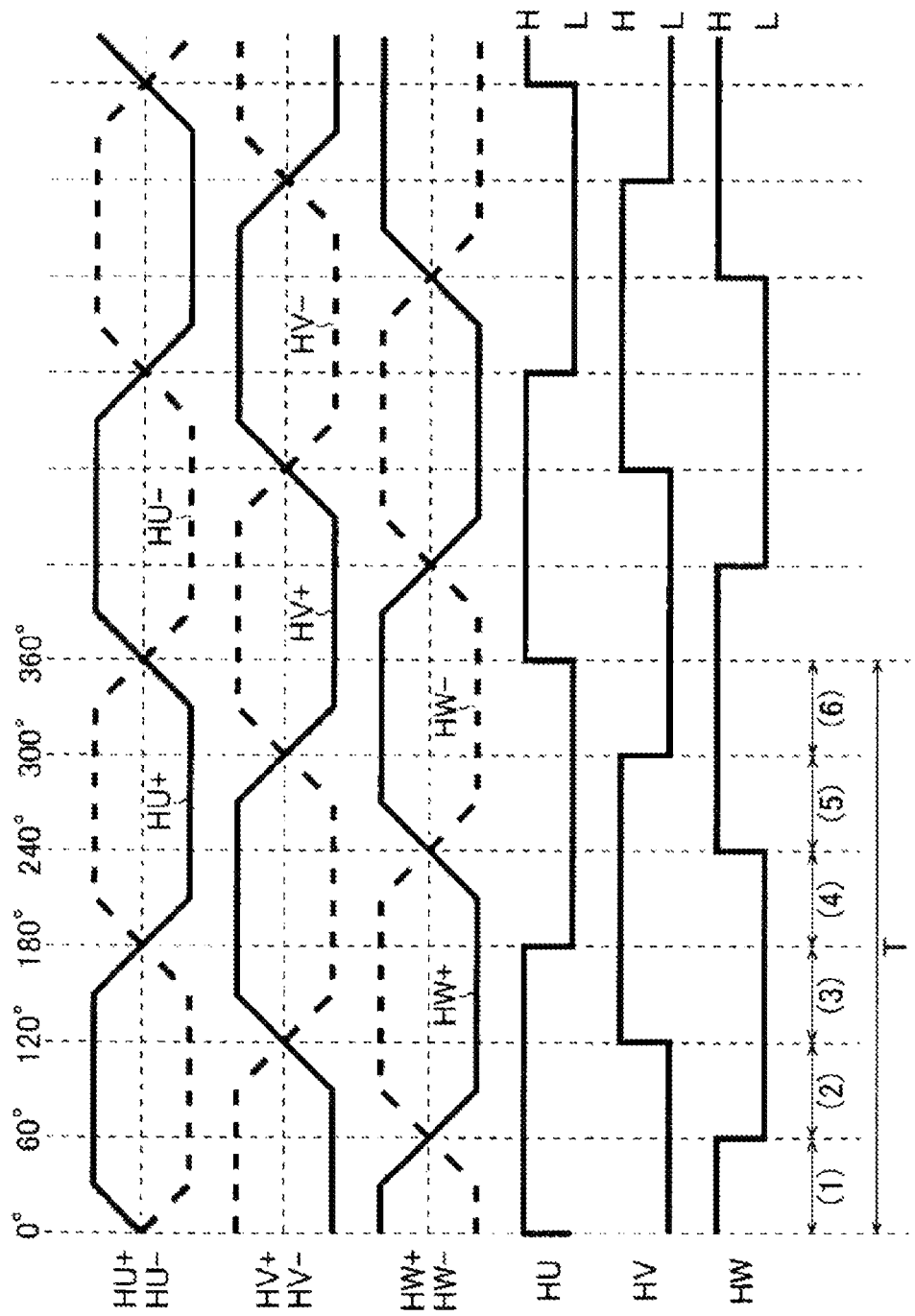
FIG. 4 depicts a timing chart showing transitions of hall signals and position signals, according to one embodiment of the present disclosure.

FIG. 3 shows a timing chart showing transitions of the driver driving signals UH/UL, VH/VL and WH/WL and the electrical conducting signals U, V and W in a 180° electrical conduction mode, according to one embodiment of the present disclosure. FIG. 4 describes a timing chart showing transitions of the hall signals HU+/HU−, HV+/HV− and HW+/HW− and the position signals HU, HV and HW in the 180° electrical conduction mode, according to one embodiment of the present disclosure.

In a range of electrical angle 0° to 60° (phase (1)), since the driver driving signals UH, VL and WH have a high level and the driver driving signals UL, VH and WL have a low level, the power transistors M1, M4 and M5 are turned on and the power transistors M2, M3 and M6 are turned off. As a result, since the electrical conduction signals U and W have a high level and the electrical conduction signal V has a low level, a driving current flows into the motor 3 from the U phase and W phase terminals toward the V phase terminal During the phase (1), the position signals HU and HW have a high level and the position signal HV has a low level.

In a range of electrical angle 60° to 120° (phase (2)), since the driver driving signals UH, VL and WL have a high level and the driver driving signals UL, VH and WH have a low level, the power transistors M1, M4 and M6 are turned on and the power transistors M2, M3 and M5 are turned off. As a result, since the electrical conduction signal U has a high level and the electrical conduction signals V and W have a low level, a driving current flows into the motor 3 from the U phase terminal toward the V phase and W phase terminals. During the phase (2), the position signal HU has a high level and the position signals HV and HW have a low level.

In a range of electrical angle 120° to 180° (phase (3)), since the driver driving signals UH, VH and WL have a high level and the driver driving signals UL, VL and WH have a low level, the power transistors M1, M3 and M6 are turned on and the power transistors M2, M4 and M5 are turned off. As a result, since the electrical conduction signals U and V have a high level and the electrical conduction signal W has a low level, a driving current flows into the motor 3 from the U phase and V phase terminals toward the W phase terminal During the phase (3), the position signals HU and HV have a high level and the position signal HW has a low level.

In a range of electrical angle 180° to 240° (phase (4)), since the driver driving signals UL, VH and WL have a high level and the driver driving signals UH, VL and WH have a low level, the power transistors M2, M3 and M6 are turned on and the power transistors M1, M4 and M5 are turned off. As a result, since the electrical conduction signal V has a high level and the electrical conduction signals U and W have a low level, a driving current flows into the motor 3 from the V phase terminal toward the U phase and W phase terminals. During the phase (4), the position signal HV has a high level and the position signals HU and HW have a low level.

In a range of electrical angle 240° to 300° (phase (5)), since the driver driving signals UL, VH and WH have a high level and the driver driving signals UH, VL and WL have a low level, the power transistors M2, M3 and M5 are turned on and the power transistors M1, M4 and M6 are turned off. As a result, since the electrical conduction signals V and W have a high level and the electrical conduction signal U has a low level, a driving current flows into the motor 3 from the V phase and W phase terminals toward the U phase terminal. During the phase (5), the position signals HV and HW have a high level and the position signal HU has a low level.

In a range of electrical angle 300° to 360° (phase (6)), since the driver driving signals UL, VL and WH have a high level and the driver driving signals UH, VH and WL have a low level, the power transistors M2, M4 and M5 are turned on and the power transistors M1, M3 and M6 are turned off. As a result, since the electrical conduction signal W has a high level and the electrical conduction signals U and V have a low level, a driving current flows into the motor 3 from the W phase terminal toward the U phase and V phase terminals. During the phase (6), the position signal HW has a high level and the position signals HU and HV have a low level.

In this manner, in the 180° electrical conduction mode, the logic level of each of the electrical conduction signals U, V and W is switched every 180° with 120° phase difference. The upper driver driving signals UH, VH and WH and the lower driver driving signals UL, VL and WL are depicted as logically-inverted signals for the purpose of simple illustration in FIGS. 3 and 4, but in actuality, for the purpose of preventing a through current, a specified dead time period (i.e., time period where both of the upper and lower power transistors have a low level) may exists after the upper driver driving signals UH, VH and WH have been changed to a low level and before the lower driver driving signals UL, VL and WL are changed to a high level or after the lower driver driving signals UH, VH and WH have been changed to a low level and before the upper driver driving signals UL, VL and WL are changed to a high level. In addition, for the purpose of simple illustration in FIGS. 3 and 4, the chopping for the driver driving signals UH/UL, VH/VL and WH/WL is not explicitly shown.

In addition, a mode of the motor driving control is not limited to the 180° electrical conduction mode but may employ another mode, for example, a 120° electrical conduction mode, a 150° electrical conduction mode, and so on.

<Chopping>

FIG. 5 describes a diagram showing waveforms of the triangular wave voltage Vosc and the hall voltage VU (or VV, VW), according to one embodiment of the present disclosure. The logic unit 13 may chop the pre-driver driving signals uh/ul, vh/vl and wh/wl by comparing the triangular wave voltage Vosc having the amplitude (e.g., fixed amplitude) Vx and the hall voltage VU (or VV, VW) having the amplitude (e.g., variable amplitude) Vy.

In chopping the pre-driver driving signals uh/ul, vh/vl and wh/wl, the logic unit 13 may perform a variable control on the amplitude Vy and a duty cycle control for the chopping in response to the feedback signal S3. For example, the logic unit 13 increases the amplitude Vy and the chopping duty cycle with an increase in a level of the feedback signal S3, while decreasing the amplitude Vy and the chopping duty cycle with a decrease in the level of the feedback signal S3. The level of the feedback signal S3 may increase when the rotational speed of the motor 3 is lower than the target value, while decreasing when the rotational speed of the motor is higher than the target value. The duty cycle control may allow the rotational speed of the motor 3, which may be changed due to a fluctuation in the power supply or load, to be immediately corrected to maintain the rotational speed of the motor 3 at the target value.

<Rotational Speed Feedback Control Unit>

Figure 6:
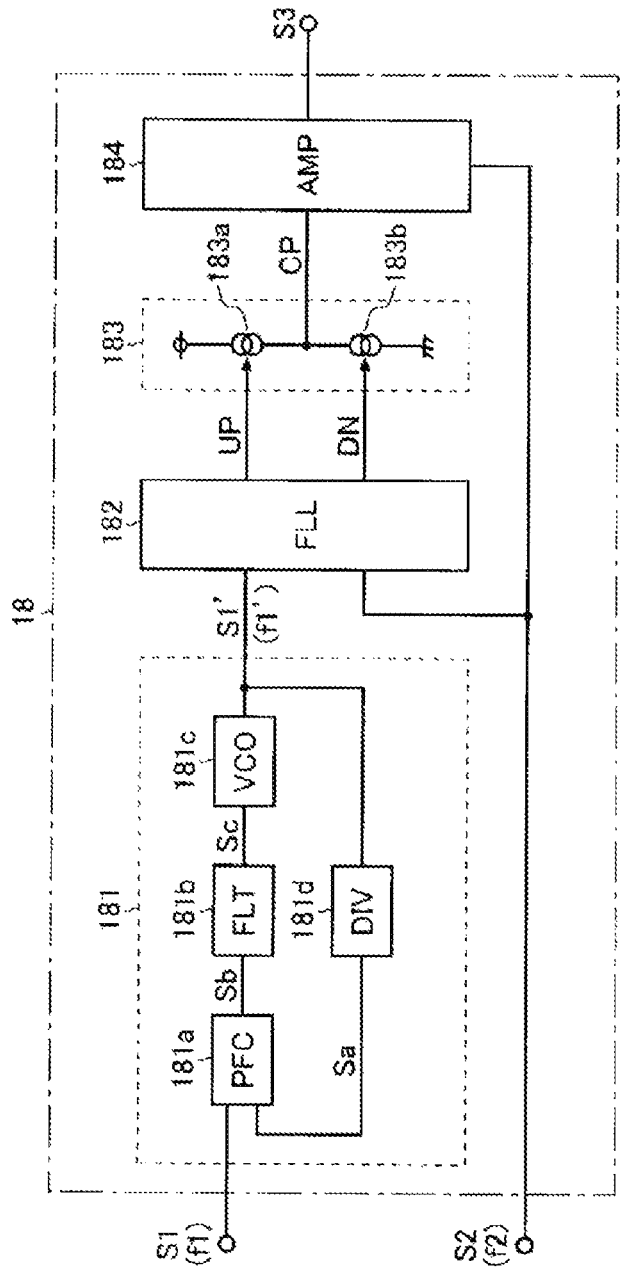
FIG. 6 illustrates a block diagram of a rotational speed feedback control unit, according to one embodiment of the present disclosure.

FIG. 6 illustrates a block diagram of the rotational speed feedback control unit 18, according to one embodiment of the present disclosure. The rotational speed feedback control unit 18 may include a PLL (Phase Locked Loop) unit 181, a FLL (Frequency Locked Loop) unit 182, a charge pump unit 183, an integral Amp unit 184 as shown in FIG. 6.

The PLL unit 181 includes a phase comparator 181a, a loop filter 181b, a voltage-controlled oscillator 181c and a frequency divider 181d. The PLL unit 181 adjusts (e.g., multiplies) the oscillation frequency f1 of the reference clock signal S1 by N to generate a reference clock signal (also referred to as "frequency-adjusted reference clock signal") S1' (having an oscillation frequency f1'=N×f1) and output the reference clock signal S1' to the FLL unit 182.

The phase comparator (or PFC (Phase Frequency Comparator)) 181a compares the reference clock signal S1 and a frequency-divided clock signal Sa to generate a phase error signal Sb.

The loop filter 181b filters out unwanted short-period fluctuations contained in the phase error signal Sb to generate a control voltage signal Sc.

The voltage-controlled oscillator (VCO) 181c generates the reference clock signal S1' having the oscillation frequency f1' based on the control voltage signal Sc.

The frequency divider 181d divides the oscillation frequency f1' of the reference clock signal S1' by N to generate the frequency-divided clock signal Sa.

The FLL unit 182 compares the oscillation frequency f1' of the reference clock signal S1' and the oscillation frequency f2 of the FG signal S2 to generate frequency error signals (i.e., an acceleration signal UP and a deceleration signal DN). For example, the FLL unit 182 outputs the acceleration signal UP when the rotational speed of the motor 3 is lower than the target value, i.e., f1'>f2, while outputting the deceleration signal DN when the rotational speed of the motor 3 is higher than the target value, i.e., f1'<f2.

The charge pump unit 183 includes current sources 183a and 183b and increases or decreases an output voltage CP in response to the frequency error signals (i.e., the acceleration signal UP and the deceleration signal DN). The current source 183a performs a switching-ON/OFF control for a source current flowing from a power supply terminal toward an output terminal in response to the acceleration signal UP. The current source 183b performs the switching-ON/OFF control for a sink current flowing from the output terminal toward the ground terminal in response to the deceleration signal DN. For example, when the rotational speed of the motor 3 is lower than the target value, the source current flows as the acceleration signal UP is input to the current source 183a, thereby increasing the output voltage CP. Conversely, when the rotational speed of the motor 3 is higher than the target value, the sink current flows as the deceleration signal DN is input to the current source 183b, thereby decreasing the output voltage CP.

The integral Amp unit 184 generates the feedback signal S3 by integrally amplifying the output voltage CP with a gain G varied depending on the oscillation frequency f2 of the FG signal S2.

In the manner as described above, the rotational speed feedback control unit 18 may change a feedback gain by varying the gain G of the integral Amp unit 184 depending on the oscillation frequency f2 of the FG signal S2. The configuration and operation of the integral Amp unit 184 is described below in detail.

Figure 7:
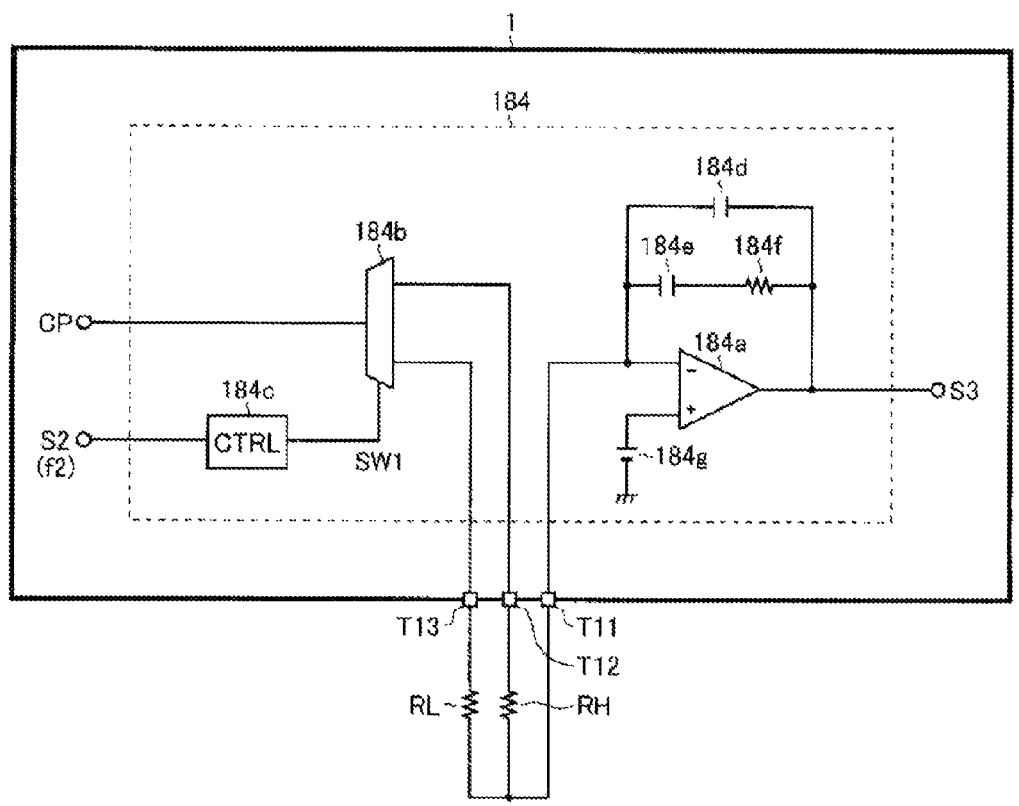
FIG. 7 shows a block diagram of an integral Amp unit, according to one embodiment of the present disclosure.

FIG. 7 shows a block diagram of the integral Amp unit 184, according to one embodiment of the present disclosure. The integral Amp unit 184 includes an OP Amp 184a, a deMux 184b, a gain switching control unit 184c, capacitors 184d and 184e, a resistor 184f, a voltage source 184g and resistors RH and RL (it is assumed herein that RH<RL in terms of resistance). All components 184a to 184g except the resistors RH and RL may be integrated in the semiconductor device 1 as shown in FIG. 7.

A non-inverted input terminal (+) of the OP Amp 184a is connected to an anode of the voltage source 184g. A cathode of the voltage source 184g is connected to the ground. An inverted input terminal (−) of the OP Amp 184a is connected to an external terminal T11. An output terminal of the OP Amp 184a is connected to an input terminal for the feedback signal S3. First terminals of the capacitors 184d and 184e are both connected to the inverted input terminal (−) of the OP Amp 184a. A second terminal of the capacitor 184e is connected to a first terminal of the resistor 184f. A second terminal of the capacitor 184d and a second terminal of the resistor 184f are both connected to the output terminal of the OP Amp 184a. A first terminal of the resistor RH is connected to an external terminal T12. A first terminal of the resistor RL is connected to an external terminal T13. Second terminals of the resistors RH and RL are both connected to the external terminal T11.

An input terminal of the deMux 184b is connected to an input terminal for the output signal CP. A first output terminal of the deMUX 184b is connected to the external terminal T12. A second output terminal of the deMUX 184b is connected to the external terminal T13. A control terminal of the deMUX 184b is connected to an input terminal for a gain switching signal SW1 (i.e., output terminal of the gain switching control unit 184c). The deMUX 184b outputs the output signal CP to the first output terminal when the gain switching signal SW1 has a first logic level (e.g., a high level), while outputting the output signal CP to the second output terminal when the gain switching signal SW1 has a second logic level (e.g., a low level).

The gain switching control unit 184c switches the logic level of the gain switching signal SW1 based on the oscillation frequency f2 of the FG signal S2.

Figure 8:
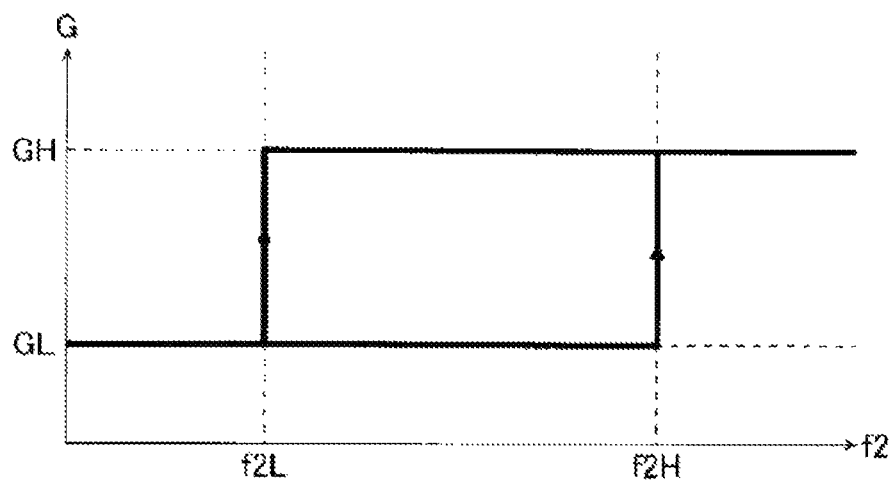
FIG. 8 depicts a view for a gain adjustment operation using two-step switching control, according to one embodiment of the present disclosure.

FIG. 8 depicts a view for a gain adjustment operation using a two-step switching control, according to one embodiment of the present disclosure. When the oscillation frequency f2 of the FG signal S2 exceeds an upper threshold f2H as the rotational speed of the motor 3 is increased, the gain switching control unit 184c may set the gain switching signal SW1 to the first logic level. In such a manner, as the deMUX 184b outputs the output signal CP to the first output terminal which is connected to the resistor RH, the gain G of the integral Amp unit 184 is set to a high gain GH according to the resistor RH.

On the other hand, when the oscillation frequency f2 of the FG signal S2 is lower than a lower threshold f2L (<f2H) as the rotational speed of the motor 3 is decreased, the gain switching control unit 184c may set the gain switching signal SW1 to the second logic level. In such a manner, as the deMUX 184b outputs the output signal CP to the second output terminal which is connected to the resistor RH, the gain G of the integral Amp unit 184 is set to a low gain GL according to the resistor RL.

In the manner as described above, by decreasing the feedback gain when the rotational speed of the motor 3 is low, it may be possible to continue the rotational speed feedback control without causing hunting of the motor 3. In addition, as shown in FIG. 8, if hysteresis is applied for the gain switching thresholds f2H and f2L, it may be possible to prevent unnecessary gain switching.

In addition, since the integral Amp unit 184 allows the gain G (i.e., the high gain GH and the low gain GL) to be adjusted by the external resistors RH and RL, it may be possible to set an appropriate feedback gain regardless of the number of poles of the motor 3.

Figure 9:
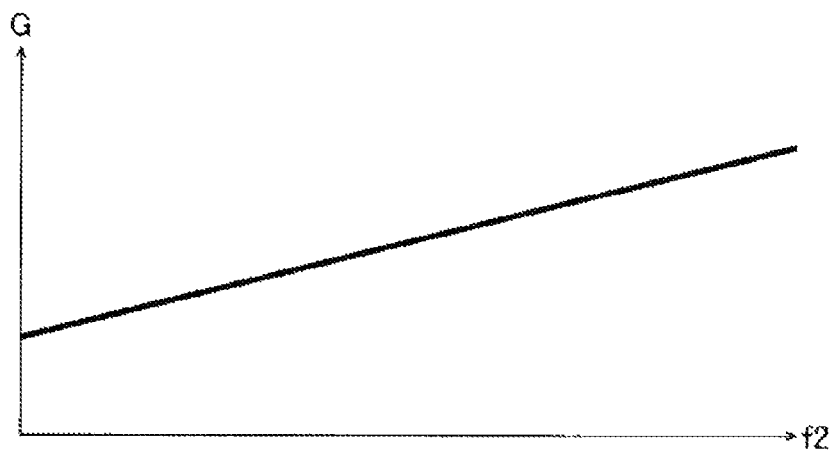
FIG. 9 describes a view for a gain adjustment operation using linear variable control, according to another embodiment of the present disclosure.

In addition, the gain adjustment operation of the integral Amp unit 184 is not limited to step-by-step (i.e., discontinuous) switching of the gain G (see FIG. 8) based on the oscillation frequency f2 of the FG signal S2 but may employ, for example, continuous switching of the gain G (see FIG. 9) based on the oscillation frequency f2 of the FG signal S2.

<First Modification>

Figure 10:
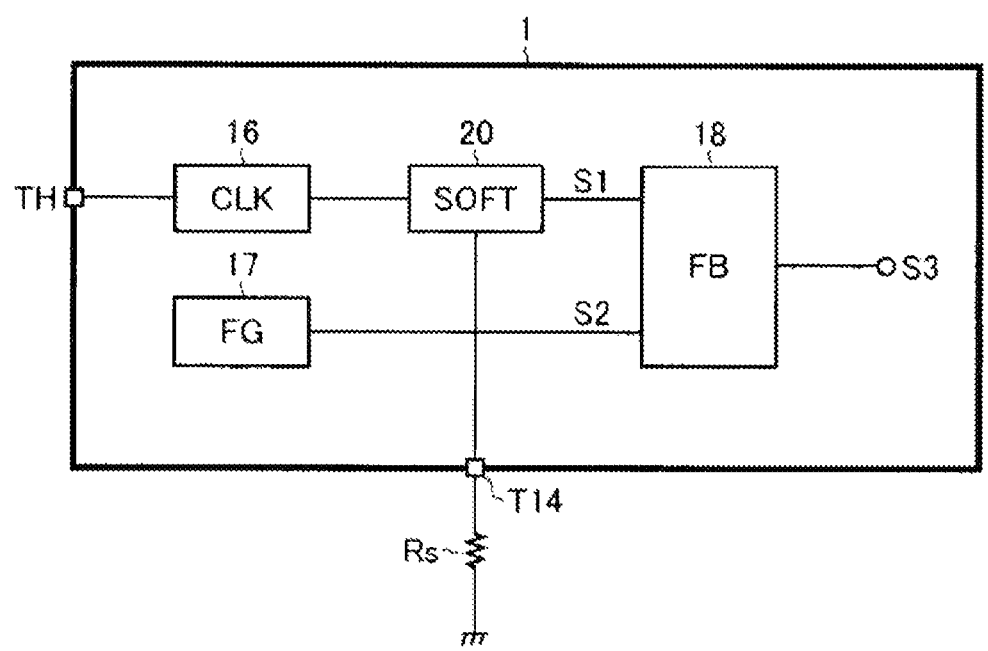
FIG. 10 illustrates a block diagram of a semiconductor device, according to a first modified embodiment of the present disclosure.

FIG. 10 illustrates a block diagram of the semiconductor device 1, according to a first modified embodiment of the present disclosure. In the first modified embodiment, the semiconductor device 1 further includes a soft processing unit 20 disposed between the reference clock signal generating unit 16 and the rotational speed feedback control unit 18. The soft processing unit 20 is configured to suppress a steep frequency fluctuation of the reference clock signal S1.

Figure 11:
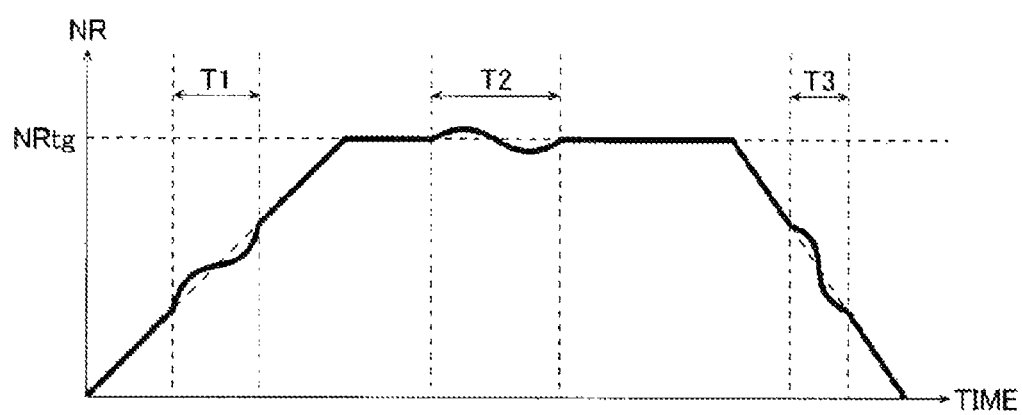
FIG. 11 shows a view for a soft processing operation.

The soft processing unit 20 may gradually change a rotational speed NR (Number of Revolution) of the motor 3 when the motor 3 starts or stops operating, thereby preventing an occurrence of an unintended rush current (see FIG. 11).

In addition, the soft processing unit 20 may also adjust a rate of change (i.e., amount of change per unit time) of the rotational speed NR using a resistor Rs attached to an external terminal T14.

In addition, an adjustment factor (i.e., amount of adjustment per unit time) of the rotational speed NR by the rotational speed feedback control may be set by the soft processing unit 20 separately from the rate of change of the rotational speed NR. As indicated by periods T1, T2 and T3 in FIG. 11, the rotational speed NR may be adjusted to a target value at each period with the same correction factor at any of a rising period (T1), a normal period (T2) and a falling period (T3) of the rotational speed NR.

<Second Modification>

Figure 12:
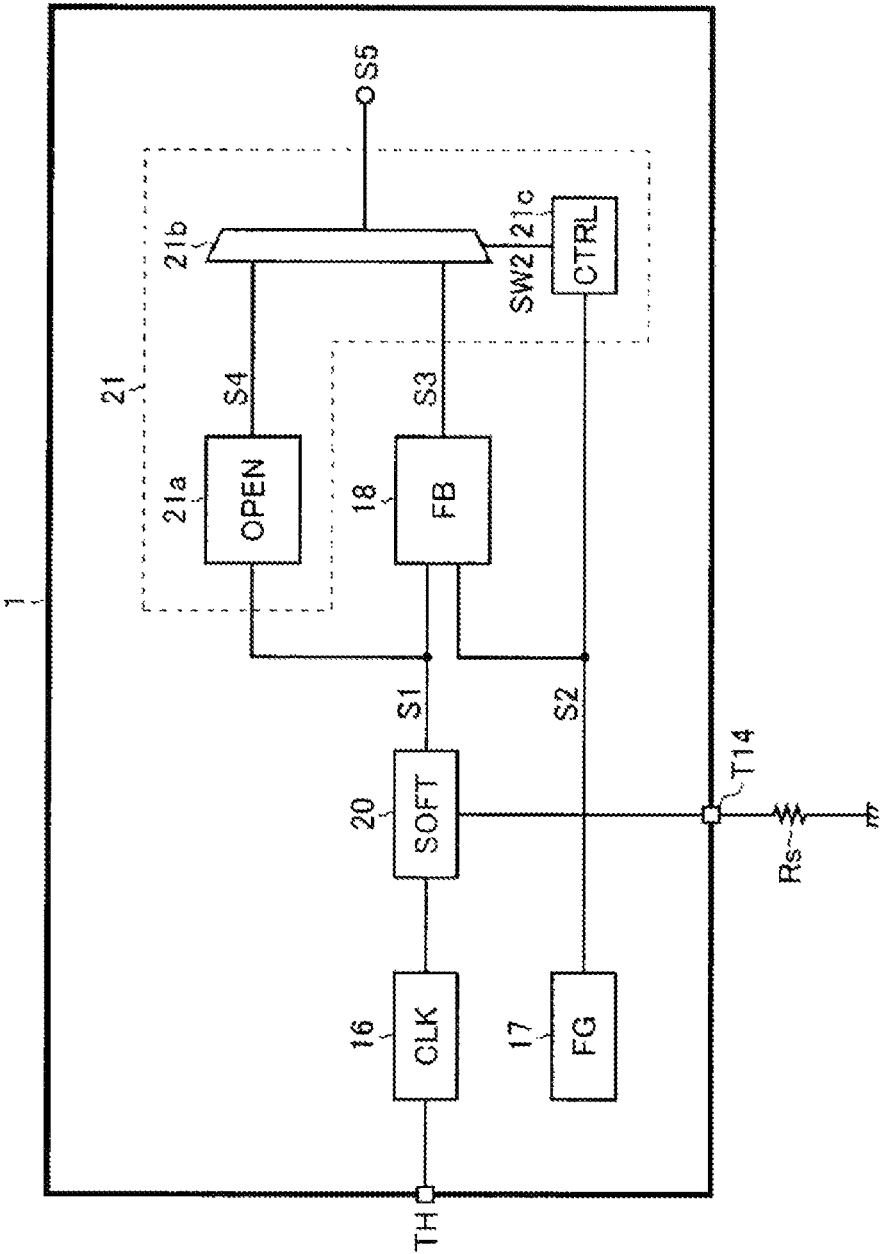
FIG. 12 depicts a block diagram of a semiconductor device, according to a second modified embodiment of the present disclosure.

FIG. 12 depicts a block diagram of the semiconductor device 1, according to a second modified embodiment of the present disclosure. In the second modified embodiment, the semiconductor device 1 further includes a mask unit 21 for masking the feedback signal S3 in response to the FG signal S2. The mask unit 21 includes an open signal generator 21a, a MUX 21b and a mask controller 21c.

The open signal generating unit 21a generates an open signal S4 in response to the reference clock signal S1 which may indicate a target rotational speed without depending on the FG signal S2 which may indicate an actual rotational speed.

The MUX 21b outputs one of the feedback signal S3 and the open signal S4 as a select signal S5 in response to a mask switching signal SW2. For example, the MUX 21b outputs the feedback signal S3 as the select signal S5 when the mask switching signal SW2 has the first logic level (e.g., high level), while outputting the open signal S4 as the select signal S5 when the mask switching signal SW2 has the second logic level (e.g., low level).

The mask controller 21c switches the logic level of the mask switching signal SW2 based on the oscillation frequency f2 of the FG signal S2.

The mask unit 21 may allow the logic unit 13 to control a duty cycle of the chopping in response to the input select signal S5 instead of the feedback signal S3.

Figure 13:
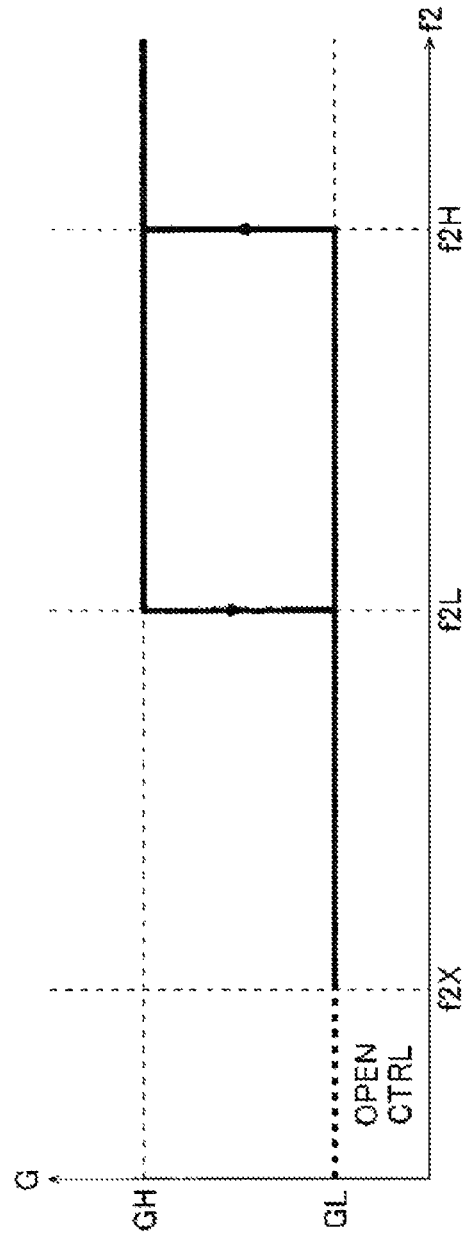
FIG. 13 illustrates a view of switching between rotational speed feedback control and open control, according to one embodiment of the present disclosure.

FIG. 13 illustrates a view of switching between the rotational speed feedback control and the open control. When the oscillation frequency f2 of the FG signal S2 is below a mask threshold f2X lower than the lower threshold f2L as the rotational speed of the motor 3 decreases, the mask controller 21c switches the mask switching signal SW2 from the first logic level to the second logic level. In such a manner, as the MUX 21b enters from the state where the feedback signal S3 is output as the select signal S5 into the state where the open signal S4 is output as the select signal S5, the rotational speed feedback control may be switched to the open control.

In the manner as described above, if the rotational speed of the motor 3 is decreased enough to cause hunting of the motor 3 even when the feedback gain of the rotational speed feedback control is lowered, it may be possible to reliably prevent an occurrence of the hunting in the motor 3 by switching the rotational speed feedback control to the open control using the feedback signal S3.

In addition, although not shown in FIG. 13, the hysteresis may be applied for the mask switching threshold f2X in order to prevent unnecessary mask switching.

<Application to Vehicle>

Figure 14:
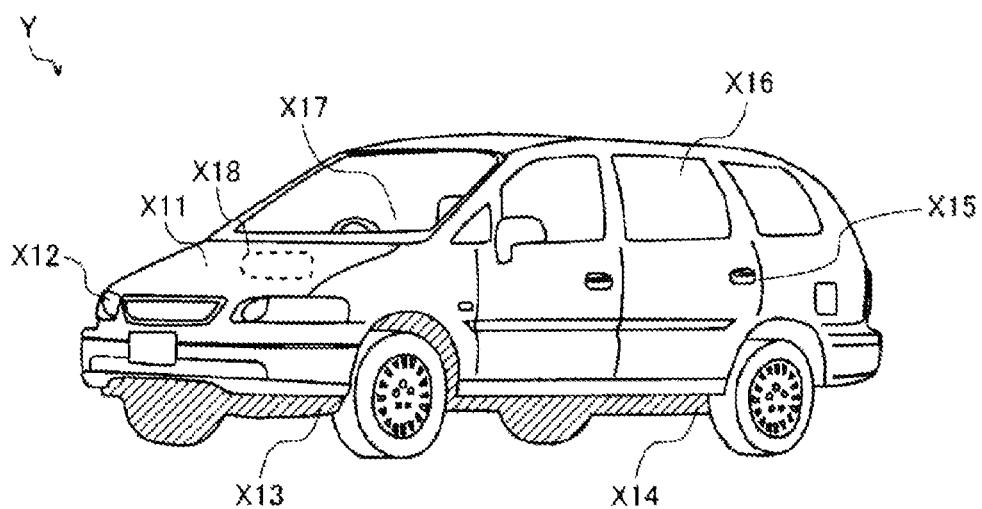
FIG. 14 shows an external appearance view of a vehicle equipped with electronic apparatuses, according to one embodiment of the present disclosure.

FIG. 14 shows an external appearance view of a vehicle equipped with a variety of electronic apparatuses, according to one embodiment of the present disclosure. A vehicle Y may be equipped with a variety of electronic apparatuses X11 to X18 operating with a power supply voltage VCC from a battery (not shown). For convenience of illustration, mounting positions of the electronic apparatuses shown in FIG. 14 may be different from actual mounting positions.

The electronic apparatus X11 is an engine control unit for performing engine-related controls (such as injection control, electronic throttle control, idling control, oxygen sensor heater control, automatic cruise control, and so on).

The electronic apparatus X12 is a lamp control unit for controlling an operation of turning-ON/OFF of HID (High Intensity Discharged lamp), DRL (Daylight Running Lamp) and the like.

The electronic apparatus X13 is a transmission control unit for performing a transmission-related control.

The electronic apparatus X14 is a body control unit for performing a control related to a movement of the vehicle Y (such as an Anti-lock Brake System (ABS) control, an Electric Power Steering (EPS) control, an electronic suspension control and the like).

The electronic apparatus X15 is a security control unit for controlling a door lock, a security alarm and the like.

The electronic apparatus X16 is an electronic apparatus which may be installed in the vehicle Y at a factory shipping stage, as standard equipment or maker optional accessories, such as an air conditioner, a wiper, an electric door mirror, a power window, a damper (i.e., shock absorber), an electric sun roof, and so on.

The electronic apparatus X17 is an electronic apparatus optionally equipped in the vehicle Y as user options such as a car A/V (Audio/Visual) device, a car navigation system, an Electronic Toll Collection (ETC) system, and so on.

The electronic apparatus X18 is an electronic apparatus including a high pressure resistant motor such as an automotive blower, an oil pump, a water pump, a battery cooling fan, and so on.

Among the above-mentioned electronic apparatuses X11 to X18, electronic apparatuses including a brushless DC motor may employ the above-described configuration of the electronic apparatus X.

<Other Modifications>

In addition to the above embodiments, the various technical features disclosed herein may be modified in different ways without departing from the gist of technical creation. For example, the motor driving device may have a variety of applicability (for example, for household appliances).

According to some embodiments in the present disclosure, it is possible to provide a motor driving device which is capable of performing the rotational speed feedback control even in low speed rotation of a motor, an electronic apparatus and a vehicle including the same.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

<Industrial Applicability>

The present disclosure can be applied to the general motor driving devices including an automotive 3-phase brushless DC motor driver IC.

What is claimed is:

1. A motor driving device comprising:
   a logic unit configured to control an electrical conduction of a motor;
   a reference clock signal generating unit configured to generate a reference clock signal based on a rotational speed indication signal;
   a rotational speed signal generating unit configured to generate a rotational speed signal based on a rotational speed of the motor; and
   a rotational speed feedback control unit configured to receive the reference clock signal and the rotational speed signal and control the logic unit so that the rotational speed of the motor reaches a target value,
   wherein the rotational speed feedback control unit changes a feedback gain in response to the rotational speed signal,
   wherein the rotational speed feedback control unit includes:
   a FLL (Frequency Locked Loop) unit configured to generate a frequency error signal by comparing the reference clock signal and the rotational speed signal;
   a charge pump unit configured to increase or decrease an output voltage in response to the frequency error signal; and
   an integral amplifier unit configured to generate a feedback signal by integrally amplifying the output voltage with a gain which is varied based on the rotational speed signal, and
   wherein the logic unit chops an electrical conduction signal with a duty cycle which is changed depending on the feedback signal.

2. The motor driving device of claim 1, wherein the integral amplifier unit varies the gain step by step in response to the rotational speed signal.

3. The motor driving device of claim 2, wherein the integral amplifier unit varies the gain with hysteresis.

4. The motor driving device of claim 1, wherein the integral amplifier unit varies the gain continuously in response to the rotational speed signal.

5. The motor driving device of claim 1, wherein the rotational speed feedback control unit further includes a PLL (Phase Locked Loop) unit configured to output a frequency-adjusted reference clock signal to the FLL unit by multiplying a frequency of the received reference clock signal.

6. The motor driving device of claim 1, further comprising a soft processing unit configured to suppress a steep frequency fluctuation of the reference clock signal.

7. The motor driving device of claims 1, further comprising a mask unit configured to mask the feedback signal in response to the rotational speed signal.

8. An electronic apparatus comprising:
   the motor driving device of claim 1, which is configured to drive the motor.

9. A vehicle comprising the electronic apparatus of claim 8.

* * * * *